(12) United States Patent
Yoon et al.

(10) Patent No.: US 10,288,934 B2
(45) Date of Patent: May 14, 2019

(54) FLAT PANEL DISPLAY EMBEDDING OPTICAL IMAGING SENSOR

(71) Applicant: LG Display Co., Ltd., Seoul (KR)

(72) Inventors: ARa Yoon, Seoul (KR); Seungman Ryu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/839,156

(22) Filed: Dec. 12, 2017

(65) Prior Publication Data

US 2018/0164638 A1 Jun. 14, 2018

(30) Foreign Application Priority Data

Dec. 13, 2016 (KR) ........................ 10-2016-0169606

(51) Int. Cl.
| | |
|---|---|
| *F21V 8/00* | (2006.01) |
| *G06K 9/00* | (2006.01) |
| *G06F 3/042* | (2006.01) |
| *G02F 1/1333* | (2006.01) |
| *G02F 1/1335* | (2006.01) |

(52) U.S. Cl.
CPC .. *G02F 1/133553* (2013.01); *G02F 1/133602* (2013.01); *G06F 3/042* (2013.01); *G06K 9/0004* (2013.01); *G02B 6/0031* (2013.01); *G02B 6/0055* (2013.01); *G02B 6/0088* (2013.01); *G02F 2001/133331* (2013.01); *G06F 2203/04109* (2013.01)

(58) Field of Classification Search
CPC ............. G02F 1/1335; G02F 1/133553; G02F 1/133602; G02F 2001/133331; G02F 1/133615; G02F 2001/133616; G02F 1/133605; G02B 6/00; G06F 3/041; G06F 3/042; G06K 9/00; G06K 9/0004
See application file for complete search history.

(56) References Cited

U.S. PATENT DOCUMENTS

| | | | |
|---|---|---|---|
| 2009/0154198 A1* | 6/2009 | Lee ..................... | G02B 6/0081 362/624 |
| 2015/0212250 A1* | 7/2015 | Tai ....................... | G02B 6/0031 362/609 |
| 2015/0219834 A1* | 8/2015 | Nichol ................. | G02B 6/0076 362/607 |
| 2016/0041323 A1* | 2/2016 | Ma ....................... | G03H 1/0465 359/15 |

* cited by examiner

*Primary Examiner* — Nathanael R Briggs
(74) *Attorney, Agent, or Firm* — Polsinelli PC (57) ABSTRACT

The present disclosure relates to a flat panel display embedding an optical imaging sensor such as a fingerprint image sensor. The present disclosure provides a flat panel display embedding an image sensor comprising: a display panel including a display area and a non-display area; and a directional optical unit having a length and a width corresponding to the display panel and a thickness, and attached on a top surface of the display panel, wherein the directional optical unit includes: a cover plate; a light radiating film corresponding to the display area under the cover plate; a light incident film disposed under the cover plate; a low refractive layer disposed under the light radiating film and the light incident film, and attached on the top surface of the display panel; a reflecting layer covering one upper edge side of the cover plate facing the light incident film and one vertical side connecting to the one upper edge side; and a light source disposed at the lateral side of the display panel.

24 Claims, 5 Drawing Sheets

$T_{CP\_AIR} < \alpha < T_{VHOE\_LR} < \theta$ ex) $45° < \alpha < 55°$
$70° < \theta < 75°$

$T_{CP1\_AIR} < \alpha < T_{CP2\_LR1} \approx T_{VHOE\_LR2} < \theta$ ex) $45° < \alpha < 55°$
$70° < \theta < 75°$

FIG. 5

$T_{CP1\_AIR} < \alpha < T_{CP2\_LR2} \approx T_{VHOE\_LR1} < \theta$

FLAT PANEL DISPLAY EMBEDDING OPTICAL IMAGING SENSOR

CROSS-REFERENCE TO RELATED APPLICATION

This application claims the benefit of Korea Patent Application No. 10-2016-0169606 filed on Dec. 13, 2016, which is incorporated herein by reference in its entirety for all purposes as if fully set forth herein.

BACKGROUND

Field of the Disclosure

The present disclosure relates to a display device, and more particularly, to a flat panel display embedding an optical imaging sensor. Although the present disclosure is suitable for a wide scope of applications, it is particularly suitable for a flat panel display embedding an optical imaging sensor including an ultra-thin substrate that can provide directional light.

Description of the Background

Various computer based systems including notebook computers, tablet personal computers (or, PC), smart phones, personal digital assistants, automated teller machines and/or search information system have been developed. As these devices use and store various personal information as well as business information and confidential information, it is required to strengthen the securities for preventing these important data being leaked.

To do so, one method has been suggested for strengthening the security using an image sensor recognizing the authorized user's biological information. For example, the fingerprint sensor is generally used for enhancing the security when registering and authenticating are performed. The fingerprint sensor is for sensing the fingerprint of user. The fingerprint sensor may be categorized into an optical fingerprint sensor and a capacitive fingerprint sensor.

The optical fingerprint sensor uses a light source such as a light emitting diode (or LED) to irradiate light and detects the light reflected by the ridge of the fingerprint using a CMOS (complementary metal oxide semiconductor) image sensor. As the optical fingerprint sensor may scan the fingerprint using the LED light, it is required that the sensor is equipped with an additional device for a scanning process. There is a limitation to increasing the size of the object for scanning the image. Therefore, there are limitations to applying the optical fingerprint sensor to various applications such as combining with the display devices.

For conventional optical fingerprint sensors, known are Korean patent 10-060817 registered on Jun. 26, 2006 of which title is "A display apparatus having fingerprint identification sensor" and a Korean patent application 10-2016-0043216 published on Apr. 21, 2016 of which title is "Display device including fingerprinting device".

The above mentioned optical fingerprint sensor uses the display area as the touch area for inputting the user's selection and the sense area for sensing the fingerprint. However, this optical fingerprint sensor uses the diffused (or diverged) lights having very low directivity. Therefore, there is a limitation to recognize the exact fingerprint pattern. When using the collimated lights such as the infrared laser having high directivity, it is very hard to generating the sensing lights as covering the wider area. Therefore, the fingerprint sensing area is restricted in small area. In order to radiate the collimated lights over the wider scan area, specific scanning structure is required, so that this system is not suitable for portable or personal display apparatus.

Therefore, for portable devices embedding the fingerprint sensor, the capacitive fingerprint sensor is mainly used. However, the capacitive fingerprint sensor also has many problems.

The capacitive fingerprint sensor is configured to detect the difference of the electricity between the ridge and the valley of the fingerprint contacting on the fingerprint sensor. For conventional capacitive fingerprint sensors, known is US patent application 2013/0307818 published on Nov. 21, 2013 of which title is "Capacitive Sensor Packaging".

The above mentioned capacitive fingerprint sensor is an assembly type embedding with a specific push button. It has a capacitive plate and a silicon wafer having a circuit for detecting the capacitive storage different between the ridge and valley of the fingerprint. Generally, as the sizes of the ridge and valley of the fingerprint are very tiny, about 300~500 μm (micrometer), the capacitive fingerprint sensor needs a high resolution sensor array and an integrated chip (or IC) for processing the fingerprint detection. To do so, the silicon wafer includes the sensor array and the IC on one substrate.

However, when the high resolution sensor array and the IC are formed on the same silicon wafer, the assembly structure for joining the push button with the fingerprint sensor is required. Therefore, the structure would be very complex and further the non-display area (or bezel area) may be increased. In some cases, the push button (i.e., the home key of the smart phone) overlaps the fingerprint sensor, so that the thickness of the whole device becomes inevitably thick. Further, the sensing area for the fingerprint is dependent on the size of the push button.

To solve above mentioned problems and limitations, some technologies have been suggested in which the touch sensor area is used as for sensing the fingerprint. For example, known are U.S. Pat. No. 8,564,314 registered on Oct. 22, 2013 of which title is "Capacitive touch sensor for identifying a fingerprint", and Korean patent 10-1432988 registered on Aug. 18, 2014 of which title is "A capacitive touch screen for integrated of fingerprint recognition".

In general. the personal portable devices such as the smart phones, an additional transparent film are attached for protecting the display glass panel. When the above mentioned technologies are applied to the personal portable devices, as attaching the protective film thereon, the performance for sensing or recognizing the fingerprint exactly can be substantially degraded. In general, even though the protective film is attached, the touch function may be properly operated. However, the detection ability for the difference of the capacitive storage amount for sensing the fingerprint may be deteriorated by the protective film even though its thickness is very thin.

For a display embedding the capacitive fingerprint sensor, generally a protective film or a hardening glass may be further attached on the cover glass of the display. In that case, the recognition ability can be deteriorated. That is, the total thickness of the cover glass may affect to the sensitivity of the capacitive fingerprint sensor. In the interim, the diffused lights used in the sensing light source may affect to the sensitivity of the optical fingerprint sensor. When using the collimated lights for enhancing the sensitivity of the optical fingerprint sensor, the bulky and/or complex optical devices are required so that it is difficult to apply to a display for personal mobile device.

SUMMARY

In order to overcome the above mentioned drawbacks, the purpose of the present disclosure is to provide a flat panel display embedding an ultra-thin optical image sensor (or an optical image recognition apparatus). Another purpose of the present disclosure is to provide a flat panel display having an optical image sensor in which most of all or whole surface of the display panel would be used for the sensing area. Still another purpose of the present disclosure is to provide a flat panel display embedding an optical image sensor in which a directional light is used as a sensing light covering large surface. Yet another purpose of the present disclosure is to provide a flat panel display embedding an optical image sensor in which the light efficiency is enhanced by minimizing the light losses at the holographic element used for forming the directional light.

In order to accomplish the above purpose, the present disclosure provides a flat panel display embedding an image sensor comprising: a display panel including a display area and a non-display area; and a directional optical unit having a length and a width corresponding to the display panel and a thickness, and attached on a top surface of the display panel, wherein the directional optical unit includes: a cover plate having a size corresponding to the length and the width; a light radiating film corresponding to the display area under the cover plate; a light incident film disposed outside of the display area at one lateral side of the light radiating film, under the cover plate; a low refractive layer disposed under the light radiating film and the light incident film, and attached on the top surface of the display panel; a reflecting layer covering one upper edge side of the cover plate facing the light incident film and one vertical side connecting to the one upper edge side; and a light source disposed at the lateral side of the display panel as facing with the light incident film.

In one aspect, the light source provides an incident light to an incident point defined on a surface of the light incident film; the light incident film includes a first holographic pattern for converting the incident light to a propagating light having an incident angle satisfying an internal total reflection condition of the cover plate, and for sending the propagating light into the cover plate; and the light radiating film includes a second holographic pattern for converting some of the propagating light into the sensing light having a reflection angle which satisfies a total reflection condition at the top surface of the cover plate and a transmitting condition through the low refractive layer.

In one aspect, the incident angle is larger than a first internal total reflection critical angle between the light radiating film and the low refractive layer, and larger than a second internal total reflection critical angle at the upper surface of the cover plate.

In one aspect, the reflection angle is larger than a first total reflection critical angle between the cover plate and an air, and smaller than a second total reflection critical angle between the light radiating film and the low refractive layer.

In one aspect, the propagating light has an expanding angle on a horizontal plane including the length axis and the width axis, and maintains the collimated state on a vertical plane including the length axis and the thickness axis.

In one aspect, the expanding angle is at least equal to an inner angle between a first line and a second line, the first line is connecting the incident point and one end of an opposite side of the cover plate facing the light incident film, and the second line is connecting the incident point and other end of the opposite side of the cover plate.

In one aspect, the reflecting layer reflects a transparent light passing the light incident film back into the light incident film; the light incident film converts the reflected transparent light into a refracted light having an incident angle satisfying the total reflection condition inside of the cover plate, and sends to the reflecting layer; and the reflecting layer reflects the refracted light into the cover plate as a recycled propagating light.

In one aspect, the light radiating film and the light incident film are disposed under a bottom surface of the cover plate.

In one aspect, the light radiating film and the light incident film are disposed over the top surface of the cover plate.

In one aspect, the display further comprises: an upper low refractive layer disposed at the top surface of the cover plate; and an upper substrate disposed on the upper low refractive layer and the reflecting layer.

In one aspect, the propagating light satisfies the total reflection condition between the low refractive layer and the upper low refractive layer; and the radiating light is reflected at the top surface of the cover plate as satisfying the total reflection condition, and passes through the upper low refractive layer, the cover plate, the light radiating film and the low refractive layer to be a sensing light.

The present disclosure suggests a flat panel display embedding an optical image sensor that has a high resolution recognizing ability or sensitivity by providing the directionized lights (or 'oriented') as the sensing lights. The present disclosure suggests a flat panel display embedding a large area optical image sensor in which a collimated infrared laser beam is expanded over a large area corresponding to the display panel for the sensing lights using a holography technology. Further, according to the present disclosure, the protective substrate disposed on the topmost surface is used as the cover plate of the direction optical substrate. Recycling the lights passing through the holographic element, the efficiency is enhanced. Using a holographic film, the collimated light is provided as covering the large area corresponding to the display surface so that the present disclosure suggests an ultra-thin direction optical substrate. When joining the optical image sensor to the display device, the whole thickness of the display device is not thicker. The present disclosure provides an ultra-thin film type optical unit for generating the directionized sensing lights, and a flat panel display attaching the same optical unit thereon.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Referring to attached figures, we will explain various aspects of the present disclosure. Like reference numerals designate like elements throughout the detailed description. However, the present disclosure is not restricted by these aspects but can be applied to various changes or modifications without changing the technical spirit. In the following aspects, the names of the elements are selected by considering the easiness for explanation so that they may be different from actual names.

Figure 1A:
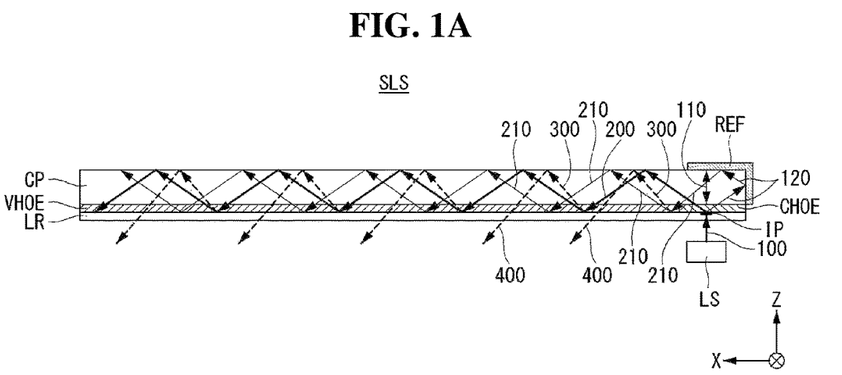
FIGS. 1A and 1B illustrate a structure of a directional optical unit applied for a flat panel display embedding an optical image sensor according to an aspect of the present disclosure.
Figure 1B:
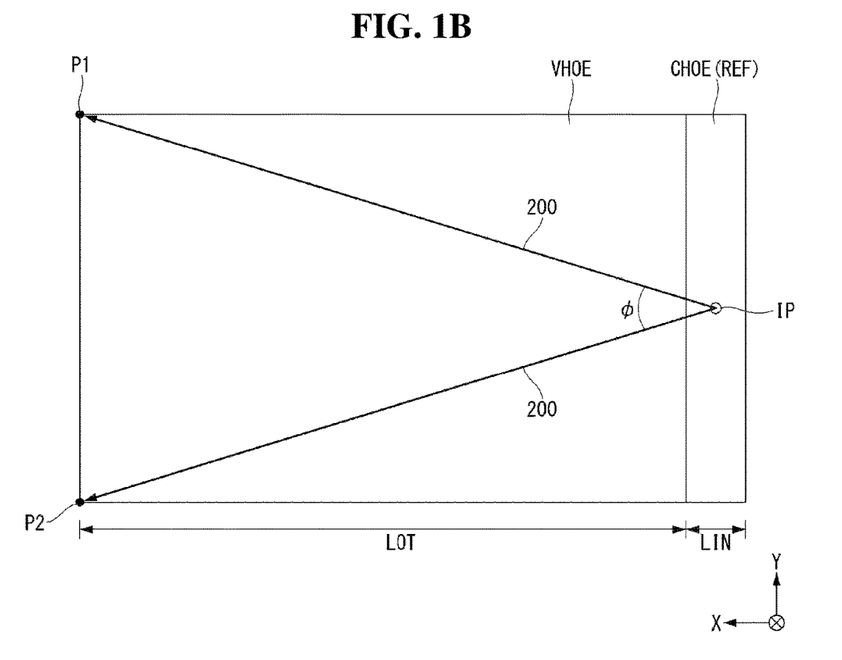
Figure 2:
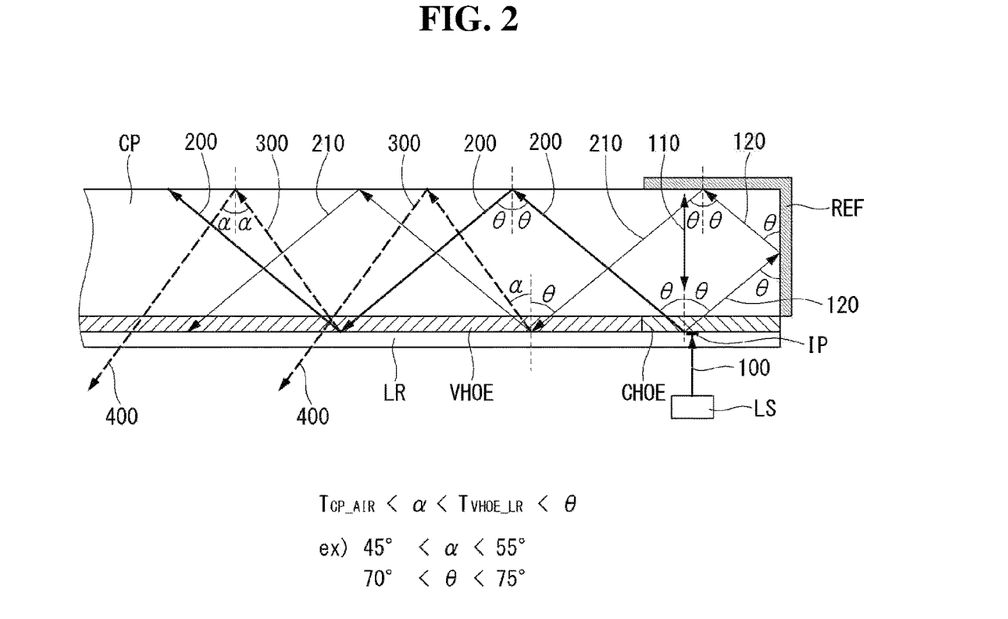
FIG. 2 is a cross-sectional view illustrating light paths inside of the direction optical substrate according to the FIG. 1.

Hereinafter, an aspect of the present disclosure will be described with reference to FIGS. 1A, 1B and 2. FIGS. 1A and 1B illustrate a structure of a directional optical substrate applied for a flat panel display embedding an optical image sensor according to an aspect of the present disclosure. More specifically, FIG. 1A is a side view on the XZ plane and FIG. 1B is a plan view on the XY plane.

Referring to FIGS. 1A and 1B, a directional optical unit according to an aspect of the present disclosure includes a directional optical substrate SLS and a light source LS. The directional optical unit is an optical device for providing the collimated light expanded covering a large area corresponding to a surface of the display. Therefore, the light source LS may provide collimated light.

The directional optical substrate SLS includes a cover plate CP, a light radiating film VHOE, a light incident film CHOE, a low refractive layer LR and a reflecting layer REF. The cover plate CP may have a rectangular plate shape having a length, a width and a thickness. In FIG. 1, the length is along the X-axis, the width is along the Y-axis and the thickness is along the Z-axis. The length of the cover plate CP is disposed along the X-axis, the width of the cover plate CP is disposed along the Y-axis, and the thickness of it is disposed along the Z-axis.

On the bottom surface of the cover plate CP, the light radiating film VHOE and the light incident film CHOE are attached. The light radiating film VHOE is an optical element for providing radiating light 300. The light radiating film VHOE may be disposed to correspond to the area for detecting and/or sensing the image.

The light incident film CHOE is an optical element for converting the collimated light provided from the light source into the light expanded over the area of the cover plate CP. The light incident film CHOE may be disposed at outside of the light radiating film VHOE. Specifically, the light incident film CHOE is disposed to face the light source LS.

The light radiating film VHOE and the light incident film CHOE may be disposed on the same plane level. Considering the manufacturing process, the light radiating film VHOE and the light incident film CHOE may be formed to be separated from each other, on the same film. The light radiating film VHOE and the light incident film CHOE may be optical elements having holographic patterns. In this case, after disposing the master film for the light radiating film VHOE and the master film for the light incident film CHOE close to each other, these two holographic patterns may be copied on one holographic recording film, at the same time.

Under the bottom surface of the light radiating film VHOE and the light incident film CHOE, a low refractive layer LR may be disposed. The low refractive layer LR has a refractive index lower than those of the cover plate CP and the light radiating film VHOE. For example, the cover plate CP may be formed of a transparent reinforced glass having a refractive index of 1.5. The light radiating film VHOE and the light incident film CHOE may be a transparent holographic recording film and may have a refractive index the same as or slightly larger than that of the cover plated CP. In this embodiment of the present disclosure, the refractive index of the light radiating film VHOE and the light incident film CHOE are the same as that of the cover plate CP. The refractive index of the low refractive layer LR is similar to the refractive index of the scanning objects. For example, when applying to the fingerprint sensor, the low refractive layer LR may have the refractive index of 1.4 similar to the refractive index of human skin, 1.39.

Then, the cover plate CP and the light radiating film VHOE having the refractive index of 1.5 are inserted between the air and the low refractive layer LR having the refractive index of 1.4. As a result, two low refractive layers are attached at the upper surface and the lower surface of the high refractive layer. This satisfies the total reflection condition in which the light can propagate inside of the high refractive layer. That is, the cover plate CP and the light radiating film VHOE may function as a light guiding space in which the light used for image sensing are expanded over the entire surface of the display panel. For the convenience, the cover plate CP is described as the representative light guiding space.

At the space under the light incident film CHOE, the light source LS is disposed to face the light incident film CHOE. The light source LS may provide highly collimated light such as a LASER beam. Specifically, when applying to the system in which the fingerprint sensor is embedded into a portable display, the light source LS may provide an infrared laser beam which cannot be recognized by human eyes.

The collimated light from the light source LS, as an incident light 100, having a predetermined cross-sectional area is provided to a light incident point IP defined on the light incident film CHOE. The incident light 100 may enter into the normal direction with respect to the surface of the incident point IP. However, it is not restricted, in other case, the incident light 100 may enter into the incident point IP with an inclined angle with respect to the normal direction.

The light incident film CHOE converts the incident light 100 into a propagating light 200 having an incident angle and sends it into the cover plate CP. Here, the incident angle may be larger than the internal total reflection critical angle of the cover plate CP. As a result, as repeating the total reflection, the propagating light 200 is propagating inside of the cover plate CP along the X-axis, which is the length direction of the cover plate CP.

The light radiating film VHOE converts some amount of the propagating light 200 into the radiating light 300 and refracts the radiating light 300 to the upper surface of the cover plate CP. Others of the propagating light 200 may continuously be propagating inside of the cover plate CP.

All incident light 100 entering into the light incident film CHOE may not be converted into the propagating lights 200. In accordance with the light efficiency of the light incident film CHOE, the amount of light converted into the propagating lights 200 among the incident lights 100 can be decided. For example, the light efficiency of the light incident film CHOE may be 80%. In that case, 20% of the incident lights 100 are passing through the light incident film CHOE and then going out from the upper surface of the cover plate CP. As a result, the 20% of the incident light 100 is wasted.

In order to recycle the lost (or wasted) amount of the light, the directional optical substrate SLS according to an aspect includes a reflecting layer REF. Specifically, the reflecting layer REF is disposed on the upper surface of the cover plate CP opposite to the light incident film CHOE. At the same time, the reflecting layer REF covers one vertical side surface of the cover plate CP connecting to the upper surface opposition to the light incident film CHOE. For example, the reflecting layer REF has a "reversed L" (or bracket) shape, as shown in FIG. 1, covering an edge portion of one upper surface and the one vertical side surface connected to the edge portion.

The transparent light 110 which is not converted into the propagating light 200 by the light incident film CHOE is reflected by the reflecting layer REF and goes back to the light incident film CHOE. The transparent light 110 reflected to the light incident film CHOE is converted into a refracted light 120 which is refracted to the mirror symmetry direction with the propagating light 200 by the light incident film CHOE. The refracted light 120 goes to the vertical side of the cover plate CP. After reflected by the vertical portion of the reflecting layer REF, the refracted light 120 goes to the upper surface of the cover plate CP. The refracted light 120 is re-reflected by the horizontal portion of the reflecting layer REF and then will be a recycled propagating light 210.

The recycled propagating light 210 has the same condition as the propagating light 200. Therefore, as repeating the total reflection, the recycled propagating light 210 is propagating inside of the cover plate CP along the X-axis which is the length direction of the cover plate CP. Further, like the propagating light 200, some of the recycled propagating light 210 may be converted into the radiating light 300 by the light radiating film VHOE.

The radiating light 300 is totally reflected at the upper surface of the cover plate CP, because the upper surface of the cover plate CP is in contact with the air of which refractive index is 1.0. However, the radiating light 300 may pass through the low refractive layer LR at the bottom surface of the cover plate CP so that the radiating light 300 goes out of the directional optical substrate SLS. In other words, the radiating light 300 totally reflected at the upper surface of the cover plate CP can be sensing light 400 as passing through the bottom surface of the cover plate CP.

As the propagating light 200 and the recycled propagating light 210 go from one side where the light incident film CHOE is disposed to the opposite side, a predetermined portion of the propagating light 200 and the recycled propagating light 210 is extracted as the radiating lights 300 by the light radiating film VHOE. The amount (or 'brightness' or 'luminance') of the radiating light 300 is decided by the light extraction efficiency of the light radiating film VHOE. For example, when the light extraction efficiency of the light radiating film VHOE is 3%, the 3% of the initial light amount of the propagating light 200 may be extracted at the first radiating point where the propagating light 200 firstly hits to the light radiating film VHOE. Then, the 97% of the propagating light 200 would be totally reflected at the first radiating point and goes on continuously. After that, at the second radiating point, 3% of the 97%, i.e., 2.91% of the initial amount of the propagating light 200 can be extracted as the radiating light 300.

Repeating this operation, a plurality of radiating lights 300 would be extracted from the first side where the light incident film CHOE to the opposite side. When the light radiating film VHOE has the same light extraction efficiency over all areas, the amount of the propagating light 200 is gradually lowered as propagating from the first side to opposite side. In order to get an evenly distributed amount of the lights over the whole area of the light radiating area, the light extraction efficiency of the light radiating film VHOE may be exponentially increased from the first side to the opposite side. Here, the light extraction efficiency of the light radiating film VHOE is the efficiency at the point where the propagating light 200 and the recycled propagating light 210 hit, so it is not the efficiency per unit area. The light extraction efficiency per unit area may have larger than 3%, i.e., it may be 20%.

As observing the propagating light 200 and the recycled propagating light 210 on the XZ plane (or, 'vertical plane') having the length axis and the thickness axis, the collimated condition of the incident light 100 is maintained. On the contrary, on the XY plane (or, 'horizontal plane') having the length axis and the width axis, the propagating light 200 and the recycled propagating light 210 are the diverged (or, expanded) lights having an expanding angle, $\phi$. The reason for expanding the propagating light 200 and the recycled propagating light 210 is that the image sensing area is set to cover most area of the cover plate CP. For example, the light radiating film VHOE may have an area corresponding to the whole area of the light going-out part LOT. Further, the expanding angle $\phi$ is the inside angle between two lines; one line is connecting the incident point IP and one end point P1 of the opposite side of the cover plate CP and the other line is connecting the incident point IP and other end point P2 of the opposite side of the cover plate CP.

The area where the light incident film CHOE is disposed may be defined as a light entering part LIN. The area where the light radiating film VHOE is disposed may be defined as a light going-out part LOT. The light going-out part LOT is the light propagating part where the light is going through. In FIG. 1, the light incident film CHOE covers the whole area of the light entering part LIN, for the convenience. Otherwise, the light incident film CHOE has a size slightly larger than the size of the light incident point IP.

For example, the cross-sectional size of the collimated light generated from the light source LS may have the right circle shape of which radius is 0.5 mm. The light incident film CHOE may have the length corresponding to the width of the cover plate CP and the width of 3 mm~5 mm. The light incident film CHOE may be disposed to cross the width of the cover plate CP.

Hereinafter, referring to FIG. 2, it is described how the collimated infrared light provided from the light source is converted into a directional infrared light used for image sensing inside of the directional optical substrate SLS. FIG. 2 is a cross-sectional view illustrating light paths inside of the direction optical substrate according to the FIG. 1.

The incident light 100 provided from the light source LS enters into the normal direction with respect to the surface of the incident point IP of the light incident film CHOE. The light incident film CHOE converts the incident light 100 into a propagating light 200 refracted as having an incident angle $\theta$ to the normal direction with respect to the surface of the incident point IP. And then, the light incident film CHOE provides the propagating light 200 to the inside space (or 'the media') of the cover plate CP.

The incident angle θ of the propagating light 200 may be larger than the total reflection critical angle $T_{VHOE\_LR}$ at the interface between the light radiating film VHOE and the low refractive layer LR. For example, when the refraction index of the cover plate CP and the light radiating film VHOE is 1.5, and the refraction index of the low refractive layer LR is 1.4, the total reflection critical angle $T_{VHOE\_LR}$ at the interface between the light radiating film VHOE and the low refractive layer LR may be greater than 69° (degree). Therefore, the incident angel θ may be larger than 69°. For example, the incident angle θ may be in the range of 70° to 75°.

The incident light 100 entering into the light incident film CHOE is converted into the propagating light 200 in accordance with the light efficiency of the light incident film CHOE. Other lights are passing through the light incident film CHOE as the transparent light 110. When the light efficiency of the light incident film CHOE is 80%, 80% of the incident light 100 may be the propagating light 200 and 20% of the incident light may be the transparent light 110.

The transparent light 110 which is not converted into the propagating light 200 by the light incident film CHOE is reflected by the reflecting layer REF and goes back to the light incident film CHOE. Here, the transparent light 110 enters into the light incident film CHOE from the opposite side with the incident light 100. Therefore, the transparent light 110 reflected to the light incident film CHOE is converted into a refracted light 120 which is refracted to the mirror symmetry direction with the propagating light 200 by the light incident film CHOE. The refracted light 120 goes to the vertical side of the cover plate CP. After reflected by the vertical portion of the reflecting layer REF, the refracted light 120 goes to the upper surface of the cover plate CP. The refracted light 120 is re-reflected by the horizontal portion of the reflecting layer REF and goes to the lower surface of the cover plate CP. The refracted light 120 going to the lower surface of the cover plate CP has the incident angle θ to the upper surface of the cover plate CP.

After reflected by the horizontal portion of the reflecting layer REF, the refracted light 120 is provide into the cover plate CP as being a recycled propagating light 210 having the same incident angle θ as the propagating light 200. That is, the recycled propagating light 210 has the same property and the same light-path as the propagating light 200. The difference between the propagating light 210 and the propagating light 200 is the points hit by them each other. As a result, the incident light 100 is converted into the propagating light 200 and the recycled propagating light 210 going through into the cover plate CP along the X-axis.

The 80% of the transparent light 100 corresponding to 20% of the incident light 100 is converted into the refracted light 120 by the light incident film CHOE. That is, the refracted light 120 is corresponding to the 16% of the incident light 100. Totally, 4% of the incident light 100 would pass the light incident film CHOE and then goes out of the cover plate CP. According to an aspect of the present disclosure, the 80% among the 20% of the incident light which may be wasted when the reflecting layer REF is not included may be recycled. According to the present disclosure, at least 96% of the incident light 100 may be used for the propagating light 200 and/or the recycled propagating light 210.

As the upper surface of the cover plate CP is contacting to the air AIR, the propagating light 200 is totally reflected at the upper surface of the cover plate CP. It is because that the total reflection critical angle $T_{CP\_AIR}$ at the interface between the cover plate CP and the air AIR is about 41.4°. That is, when the incident angle θ is larger than the total reflection critical angle $T_{VHOE\_LR}$ at the interface between the light radiating film VHOE and the low refractive layer LR, the incident angle θ is always larger than total reflection critical angle $T_{CP\_AIR}$ at the interface between the cover plate CP and the air AIR.

The light radiating film VHOE converts a predetermined amount of the propagating light 200 into a radiating light 300 having a reflection angle α and sends the radiating light 300 back into the inside space of the cover plate CP. The radiating light 300 is for detecting an image of an object when the object is contacting on the upper surface of the cover plate CP. When there is no object on the outer surface of the cover plate CP, the radiating light 300 is totally reflected at the upper surface of the cover plate CP and then is provided to the photo sensor (or, optical sensor) disposed at the outside of the bottom surface of the directional optical substrate SLS. That is, after totally reflected at the upper surface of the cover plate CP, the radiating light 300 goes out of the directional optical substrate SLS through the bottom surface of the cover plate CP. All of the sensing lights 400 have the same reflecting angle so it may be called that the sensing lights 400 are oriented (or 'directionized') to a predetermined direction.

The sensing light 400 is the light reflected by the upper surface of the cover plate CP with an incident angle (or, reflecting angle) of α. The reflecting angle α of the sensing light 400 is smaller than the incident angle θ of the propagating light 200 and the recycled propagating light 210. Therefore, the sensing light 400 passes through the cover plate CP, the light radiating film VHOE and the low refractive layer LR sequentially, and then goes out of the directional optical substrate SLS.

Detecting the sensing light 400 radiated out of the low refractive layer LR disposed under the bottom surface of the directional optical substrate SLS, the images of the object contacted on the upper surface of the cover plate CP would be recognized. The image sensing device applying the directional optical unit as shown in FIG. 1 will be explained hereinafter and specifically on a flat panel display embedding a fingerprint recognizing sensor.

Figure 3A:
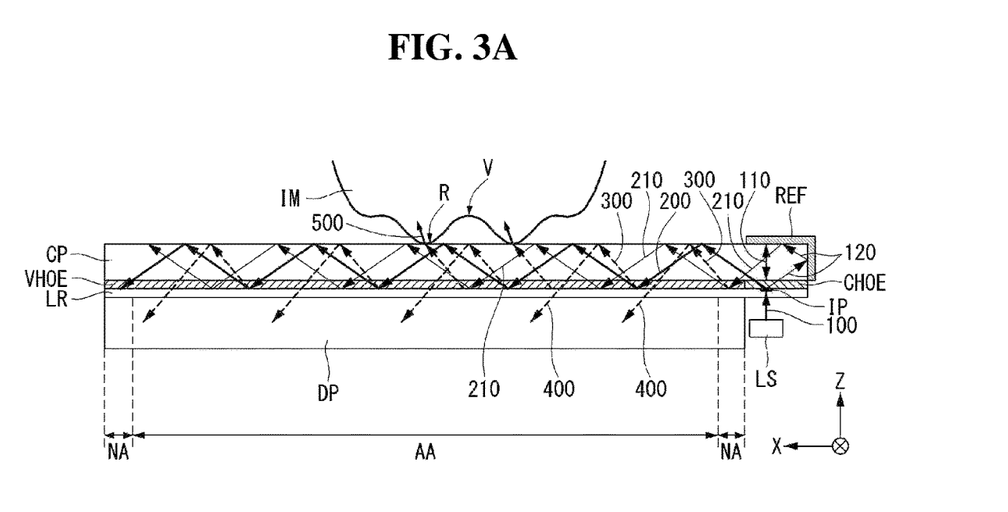
FIGS. 3A and 3B illustrate a structure of a flat panel display embedding an optical image sensor including a directional optical unit and an optical sensor, according to an aspect of the present disclosure.
Figure 3B:
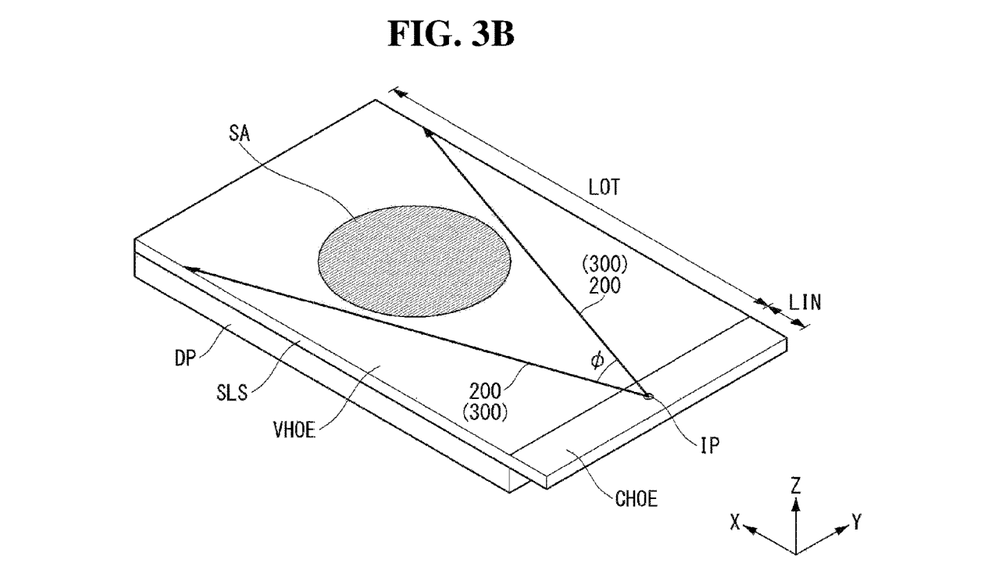

FIGS. 3A and 3B illustrate a structure of a flat panel display embedding an optical image sensor including a directional optical unit and an optical sensor, according to an aspect of the present disclosure. Referring to FIGS. 3A and 3B, a flat panel display embedding an optical image sensor according to an aspect of the present disclosure includes a display panel DP, a directional optical substrate SLS and a light source LS. The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

In detail, a plurality of pixel area for representing the video images may be arrayed in a matrix manner in the display area AA. At least one of the pixel areas, one photo sensor may be includes for detecting the image of the object. In some cases, one photo sensor may be disposed at one group of the pixel areas. For example, one photo sensor may be disposed at every pixel group including 2×2, 3×3 or 4×4 pixels.

The directional optical substrate SLS may be a thin plate having a predetermined length, width and thickness. The length and width of the directional optical substrate SLS have a size enough to correspond to the size of the display panel DP. Specifically, the directional optical substrate SLS may have the size slightly larger than that of the display panel DP. At least, the directional optical substrate SLS has the extended (or expanded) area over one side of the display panel DP. At the extended side area over the display panel DP, the light source LS may be disposed.

The directional optical substrate SLS may be joined with the display panel DP as it is attached on the upper surface of the display panel DP. The directional optical substrate SLS includes a cover plate CP, a light incident film CHOE, a light radiating film VHOE and a low reflective layer LR, as mentioned above.

The low refractive layer LR, by inserting between the cover plate CP and the display panel DP, is attached on the upper surface of the display panel DP as facing each other. Here, the upper surface of the display panel DP is the front face providing the video images from the display panel DP. That is, the user observes the video image as seeing the upper surface of the display panel DP.

The directional optical substrate SLS, as mentioned above, may provide the image sensing light 400 to the bottom surface facing with the upper surface of the display panel DP. Therefore, the photo sensor disposed in the display panel DP located under the directional optical substrate SLS may detect the image sensing light 400. As a result, the images of the object contacting on the upper surface of the directional optical substrate SLS may be recognized.

In detail, the radiating light 300 generated by the light radiating film VHOE of the directional optical substrate SLS would reach to the upper surface of the cover plate CP. When an object IM is disposed on the cover plate CP, the radiating light 300 hits the area where the object IM is not contacting is totally reflected and provided to the display panel DP as the sensing light 400. On the contrary, the radiating light 300 hits the area where the object IM is contacting is refracted and goes out to the cover plate CP. At the point where the object IM having the refraction index larger than that of air is contacting, the radiating light 300 is not totally reflected but it is refracted into the object IM. That is, at the area where the object IM is contacting, the radiating light 300 would be an absorbed light 500 so that it is not provided to the photo sensor of the display panel DP.

As the results, the photo sensor of the display panel DP detects only the sensing lights 400 except the absorbed lights 500 among the radiating lights 300. Detecting the reflection patterns of the sensing lights 400 reflected at the top surface of the cover plate CP, the photo sensors of the display panel DP reproduces the patterns or images of the object IM.

When applying the directional optical unit to the fingerprint sensor, the object IM would be the finger of the human. The ridge R of the fingerprint is contacting on the top surface of the cover plate CP but the valley V of the fingerprint is not contacting with the top surface of the cover plate CP. The radiating light 300 hit the valley V are totally reflected to be the sensing light 400. In the interim, the radiating light 300 hit the ridge R are refracted so that they may be the absorbed light 500 going out of the cover plate CP.

Even though, the 80% of the incident light 100 is converted into the propagating light 200, the final amount of the light converted into the sensing light 400 is very low. The final amount of the light is also depended on the light efficiency of the light radiating film VHOE. As the light radiating element VHOE has relatively large area as covering the surface of the cover plate CP, the light extraction efficiency per unit area would be 20% at most. As the results, the radiating light 300 would be 16% of the incident light 100. In addition, applying to the display panel, the sensing light 400 may pass a polarization film before reaching to the light sensor (or photo sensor). In that case, the final amount of the sensing light 400 may be reduced in 50%. At last, the amount of sensing light 400 used for being detected by the light sensor would be about 8% of the incident light 100.

On the contrary, according to an aspect of the present disclosure, at least 96% of the incident light 100 is converted into the propagating light 200 and the recycled propagating light 210. Therefore, the amount of sensing light 400 used for being detected by the light sensor would be at least 9.6% of the incident light 100.

Further referring to lower drawings of FIG. 3, we will explain about the process of the image sensing on the XY plane. The incident light 100 may include collimated infrared light having a predetermined cross-sectional area. The light source LS may be an infrared LASER diode (or 'IR LD').

The incident light 100 may be converted to a propagating light 200 by the light incident film CHOE. In addition, by the reflecting layer REF, a recycled propagating light 210 is generated. Here, the propagating light 200 and the recycled propagating light 210 may be expanded as having an expanding angle φ on the XY plane including the length axis on the X axis and the width axis on the Y axis. In the interim, on the XZ plane including the length axis on the X axis and the thickness axis on the Z axis, the initial collimated condition would be maintained.

Here, the expanding angle φ is equal to or slightly larger than the inside angle of two lines connecting from the light incident point IP to the two end points of the cover plate CP facing the light incident film CHOE, respectively. In this case, the propagating light 200 and the recycled propagating light 210 may be expanded as having a triangular shape. As a result, the radiating light 300 may covers the same area covered as the propagating light 200 and the recycled propagating light 210 are expanded. That is, the image sensing area may be defined inside of the triangular shape. When applying with the fingerprint sensor, the fingerprint sensing area SA may be defined as the circle area hatched in FIG. 3.

When setting the sensing area SA on the center portion or on upside-shifted portion facing with the light incident film CHOE, the amount (or luminance or brightness) of the radiating lights 300 may have the maximum value. To do so, the light radiating film VHOE may be designed as having varying light extraction efficiency according to the functional relationship with the position, to have the maximum value at the area corresponding to the sensing area SA and to have the minimum value or the zero at the other areas.

In an aspect, we explain about the case in which the light radiating film VHOE and the light incident film CHOE are disposed under the cover plate CP. However, the configuration is not restricted as explained in an aspect. For another example, the light radiating film VHOE and the light incident film CHOE may be disposed over the cover plate CP.

Figure 4:
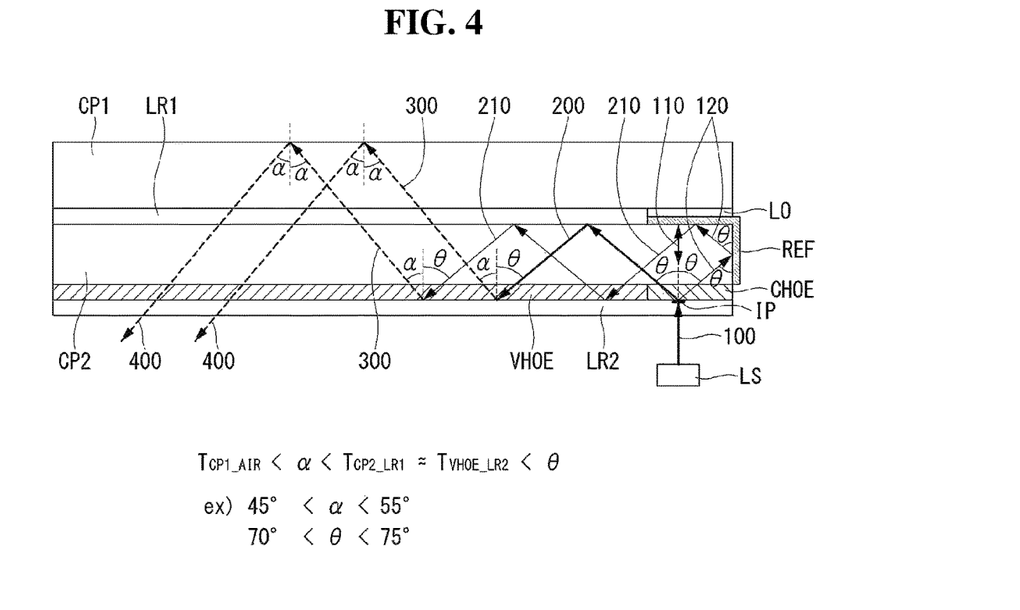
FIG. 4 is a drawing illustrating a structure of a directional optical unit, according to another aspect of the present disclosure.

Hereinafter, another aspect of the present disclosure will be described with reference to FIG. 4. FIG. 4 illustrates a structure of a directional optical unit, according to another aspect of the present disclosure.

Referring to FIG. 4, a directional optical unit according to another aspect includes a directional optical substrate SLS and a light source LS. The directional optical unit is an optical device for providing the collimated light expanded covering a large area corresponding to a surface of the display. Therefore, the light source LS may provide collimated light.

The directional optical substrate SLS includes a first cover plate CP1, a second cover plate CP2, a deco film (or decoration film) LO, a light radiating film VHOE, a light incident film CHOE, a first low refractive layer LR1 and a second low refractive layer LR2. The first cover plate CP1 and the second cover plate CP2 may have a rectangular plate shape of which a length, a width and a thickness. The lengths of the first cover plate CP1 and the second cover plate CP2 are disposed along the X-axis, the widths of the first and the second cover plate CP1 and CP2 are disposed along the Y-axis, and the thickness of them are disposed along the Z-axis.

The first cover plate CP1 and the second cover plate CP2 are joined face to face. At one side and/or at the opposite side of the bottom surface of the first cover plate CP1, a deco film LO may be disposed. The deco film LO is the decoration means or element for representing a logo, a trademark or an advertising copy of the product or the manufacturer. The deco film LO may be disposed at the non-display area including the upper side, the lower side, the left side or the right side of the display area. Under the first cover plate CP1 having the deco film LO, the first low refractive layer LR1 is disposed. In FIG. 4, two deco films LO are disposed at upper side and lower side, respectively and the first low refractive layer LR1 is disposed between these two deco films LO. However, it is not restricted in FIG. 4. The first low refractive layer LR1 may be disposed as covering all deco films LO.

The second cover plate CP2 is attached on the first cover plate CP1 with the first low refractive layer LR1 therebetween. Between the first cover plate CP1 and the second cover plate CP2, the deco film LO and the first low refractive layer LR1 are inserted. When the deco film LO is disposed on the outside surface of the first cover plate CP1 or the second cover plate CP2, it may be easily damaged or may be interfered with any other elements, because the deco film LO has a thickness. However, in the aspect of the present disclosure, the deco film LO is inserted between the first cover plate CP1 and the second cover plate CP2 so that it is not disturbed at the position where other elements are arranged.

On the bottom surface of the second cover plate CP2, the light radiating film VHOE and the light incident film CHOE are attached. The light radiating film VHOE is an optical element for providing the radiating lights 300. The light radiating film VHOE may be disposed to correspond to the area for detecting and/or sensing the image.

The light incident film CHOE is an optical element for converting the collimated light provided from the light source into the lights expanded over the area of the first cover plate CP1 and the second cover plate CP2. The light incident film CHOE may be disposed at outside of the light radiating film VHOE. Specifically, the light incident film CHOE is disposed to face the light source LS.

The light radiating film VHOE and the light incident film CHOE may be disposed on the same plane level. Considering the manufacturing process, the light radiating film VHOE and the light incident film CHOE may be formed to be separated from each other, on a same film. The light radiating film VHOE and the light incident film CHOE may be the optical elements having the holographic patterns. In this case, after disposing the master film for the light radiating film VHOE and the master film for the light incident film CHOE close to each other, these two holographic patterns may be copied on one holographic recording film, at the same time.

Under the bottom surface of the light radiating film VHOE and the light incident film CHOE, a second low refractive layer LR2 is disposed. The first low refractive layer LR1 and the second low refractive layer LR2 may have the same refractive index. Further, the first low refractive layer LR1 and the second low refractive layer LR2 may have the refractive index lower than that of the first cover plate CP1, the second cover plate CP2 and the light radiating film VHOE.

For example, the first cover plate CP1 and the second cover plate CP2 may be formed of a transparent reinforced glass of which refractive index is 1.5. The light radiating film VHOE and the light incident film CHOE may be the transparent holographic recording film and may have the refractive index same with or slightly larger than that of the first and the second cover plates CP1 and CP2. Here, in the aspect of the present disclosure, the refractive index of the light radiating film VHOE and the light incident film CHOE are the same as that of the first and the second cover plates CP1 and CP2. The refractive index of the first low refractive layer LR1 and the second low refractive layer LR2 may be similar to or slightly larger than the refractive index of the scanning objects. For example, when applying to the fingerprint sensor, the first and the second low refractive layers LR1 and LR2 may have the refractive index of 1.4 similar to the refractive index of human skin, 1.39.

Then, the second cover plate CP2 and the light radiating film VHOE having the refractive index of 1.5 are inserted between the first low refractive layer LR1 and the second low refractive layer LR2 having the refractive index of 1.4. As a result, two low refractive layers are attached at the upper surface and the lower surface of the high refractive layer. This satisfies the total reflection condition in which the light can propagate inside of the high refractive layer. That is, the second cover plate CP2 and the light radiating film VHOE may function as a light guiding space in which the lights used for the image sensing are expanded over the whole surface of the display panel.

At the space under the light incident film CHOE, the light source LS is disposed as facing with the light incident film CHOE. The light source LS may provide highly collimated light such as a LASER beam. Specifically, when applying to the system in which the fingerprint sensor is embedded into a portable display, the light source LS may provide an infrared laser beam which cannot be recognized by human eyes.

The collimated light from the light source LS, as an incident light 100, having a predetermined cross-sectional area is provided to a light incident point IP defined on the light incident film CHOE. The incident light 100 may enter into the normal direction with respect to the surface of the incident point IP. However, it is not restricted, in other case, the incident light 100 may enter into the incident point IP with an inclined angle with respect to the normal direction.

The light incident film CHOE converts the incident light 100 into a propagating light 200 having an incident angle and sends it into the second cover plate CP2. Here, the incident angle may be larger than the internal total reflection critical angle of the second cover plate CP2. As a result, as repeating the total reflection, the propagating light 200 is propagating inside of the second cover plate CP2 along the X-axis, the length direction of the second cover plate CP2.

All incident light 100 entering into the light incident film CHOE may not be converted into the propagating light 200.

In accordance with the light efficiency of the light incident film CHOE, the amount of light converted into the propagating light 200 among the incident light 100 may be decided.

In order to recycle the lost (or wasted) amount of the light, the directional optical substrate SLS according to another aspect includes a reflecting layer REF. Specifically, the reflecting layer REF is disposed on the upper surface of the second cover plate CP2 opposite to the light incident film CHOE. At the same time, the reflecting layer REF covers one vertical side surface of the second cover plate CP2 connecting to the upper surface of the second cover plate CP2 opposition to the light incident film CHOE. For example, the reflecting layer REF has a "reversed L" (or bracket) shape, as shown in FIG. 4, covering an edge portion of one upper surface and the one vertical side surface connected to the edge portion of the second cover plate CP2.

The transparent light 110 which is not converted into the propagating light 200 by the light incident film CHOE is reflected by the reflecting layer REF and goes back to the light incident film CHOE. The transparent light 110 reflected to the light incident film CHOE is converted into a refracted light 120 which is refracted to the mirror symmetry direction with the propagating light 200 by the light incident film CHOE. The refracted light 120 goes to the vertical side of the second cover plate CP2. After reflected by the vertical portion of the reflecting layer REF, the refracted light 120 goes to the upper surface of the second cover plate CP2. The refracted light 120 is re-reflected by the horizontal portion of the reflecting layer REF and then will be a recycled propagating light 210.

The recycled propagating light 210 has the same condition as the propagating light 200. Therefore, as repeating the total reflection, the recycled propagating light 210 is propagating inside of the second cover plate CP2 along the X-axis which is the length direction of the second cover plate CP2. Further, like the propagating light 200, some of the recycled propagating light 210 may be converted into the radiating light 300 by the light radiating film VHOE.

The light radiating film VHOE converts some amount of the propagating light 200 and the recycled propagating light 210 into the radiating light 300 and refracts the radiating light 300 to upper surface of the first cover plate CP1. Others of the propagating light 200 and the recycled propagating light 210 may continuously be propagating inside of the second cover plate CP2. At the upper surface of the first cover plate CP1, the radiating light 300 is reflected to the first low refractive layer LR1 and then enters into the first cover plate CP1.

The radiating light 300 is totally reflected at the upper surface of the first cover plate CP1. Because the upper surface of the first cover plate CP1 is contact with the air of which refractive index is 1.0. However, at the lower surface of the first cover plate CP1, the radiating light 300 passes through the first low refractive layer LR1 and then enters into the second cover plate CP2. Further, the radiating light 300 would transparent the second low refractive layer LR2 disposed at the bottom surface of the second cover plate CP2 so that the radiating light 300 goes out of the directional optical substrate SLS. In other words, the radiating light 300 totally reflected at the upper surface of the first cover plate CP1 may be sensing light 400 as passing through the bottom surface of the second cover plate CP2.

The light path will be explained hereinafter, in detail. The incident light 100 provided from the light source LS enters into the normal direction with respect to the surface of the incident point IP of the light incident film CHOE. The light incident film CHOE converts the incident light 100 into a propagating light 200 refracted as having an incident angle θ to the normal direction with respect to the surface of the incident point IP. And then, the light incident film CHOE provides the propagating light 200 to the inside space (or 'the media') of the second cover plate CP2.

The incident angle θ of the propagating light 200 may be larger than the total reflection critical angle $T_{VHOE\_LR2}$ at the interface between the light radiating film VHOE and the second low refractive layer LR2. Further, the incident angle θ of the propagating light 200 may be larger than the total reflection critical angle $T_{CP2\_LR1}$ at the interface between the second cover plate CP2 and the first low refractive layer LR1.

For example, when the refraction index of the second cover plate CP2 and the light radiating film VHOE is 1.5, and the refraction index of the first low refractive layer LR1 and the second low refractive layer LR2 are 1.4, the total reflection critical angle $T_{VHOE\_LR2}$ at the interface between the light radiating film VHOE and the second low refractive layer LR2 and the total reflection critical angle $T_{CP2\_LR1}$ at the interface between the second cover plate CP2 and the first low refractive layer LR1 may be greater than 69° (degree). Therefore, the incident angel θ may be larger than 69°. For example, the incident angle θ may be in the range of 70° to 75°.

The incident light 100 entering into the light incident film CHOE is converted into the propagating light 200 in accordance with the light efficiency of the light incident film CHOE. Other lights are passing through the light incident film CHOE as the transparent light 110. When the light efficiency of the light incident film CHOE is 80%, 80% of the incident light 100 would be the propagating light 200 and 20% of the incident light would be the transparent light 110.

The transparent light 110 which is not converted into the propagating light 200 by the light incident film CHOE is reflected by the reflecting layer REF and goes back to the light incident film CHOE. Here, the transparent light 110 enters into the light incident film CHOE from the opposite side with the incident light 100. Therefore, the transparent light 110 reflected to the light incident film CHOE is converted into a refracted light 120 which is refracted to the mirror symmetry direction with the propagating light 200 by the light incident film CHOE. The refracted light 120 goes to the vertical side of the second cover plate CP2. After reflected by the vertical portion of the reflecting layer REF, the refracted light 120 goes to the upper surface of the second cover plate CP2. The refracted light 120 is re-reflected by the horizontal portion of the reflecting layer REF and goes into the second cover plate CP2. The refracted light 120 going to the upper surface of the second cover plate CP2 has the incident angle θ to the upper surface of the second cover plate CP2.

After reflected by the horizontal portion of the reflecting layer REF, the refracted light 120 is provide into the second cover plate CP2 as being a recycled propagating light 210 having the same incident angle θ as the propagating light 200. That is, the recycled propagating light 210 has the same property and the same light-path as the propagating light 200. The difference between the propagating light 210 and the propagating light 200 is the points hit by them each other. As the result, the incident light 100 is converted into the propagating light 200 and the recycled propagating light 210 going through into the second cover plate CP2 along to X-axis.

The 80% of the transparent light 100 corresponding to 20% of the incident light 100 is converted into the refracted light 120 by the light incident film CHOE. That is, the refracted light 120 is corresponding to the 16% of the incident light 100. Totally, 4% of the incident light 100 may pass the light incident film CHOE and then goes out of the cover plate CP. According to yet another aspect of the present disclosure, the 80% among the 20% of the incident light which may be wasted when the reflecting layer REF is not included would be recycled. According to the present disclosure, at least 96% of the incident light 100 may be used for the propagating light 200 and/or the recycled propagating light 210.

The light radiating film VHOE converts a predetermined amount of the propagating light 200 into a radiating light 300 having a reflection angle α and sends the radiating light 300 back into the inside space of the first cover plate CP1. The radiating light 300 is for detecting an image of an object when the object is contacting on the upper surface of the first cover plate CP1. When there is no object on the outer surface of the first cover plate CP1, the radiating light 300 is totally reflected at the upper surface of the first cover plate CP1 and then is provided to the photo sensor (or, optical sensor) disposed at the outside of the bottom surface of the directional optical substrate SLS. That is, after totally reflected at the upper surface of the first cover plate CP1, the radiating light 300 goes out of the directional optical substrate SLS, as the sensing light 400.

The sensing light 400 is the light reflected by the upper surface of the first cover plate CP1 with an incident angle (or, reflecting angle) of α. The reflecting angle α of the sensing light 400 is smaller than the incident angle θ of the propagating light 200 and the recycled propagating light 210. Therefore, the sensing light 400 passes through the first cover plate CP1, the first low refractive layer LR1, the second cover plate CP2, the light radiating film VHOE and the second low refractive layer LR2 sequentially, and then goes out of the directional optical substrate SLS.

Detecting the sensing light 400 radiated out of the second low refractive layer LR2 disposed under the bottom surface of the directional optical substrate SLS, the images of the object contacted on the upper surface of the first cover plate CP1 may be recognized.

Figure 5:
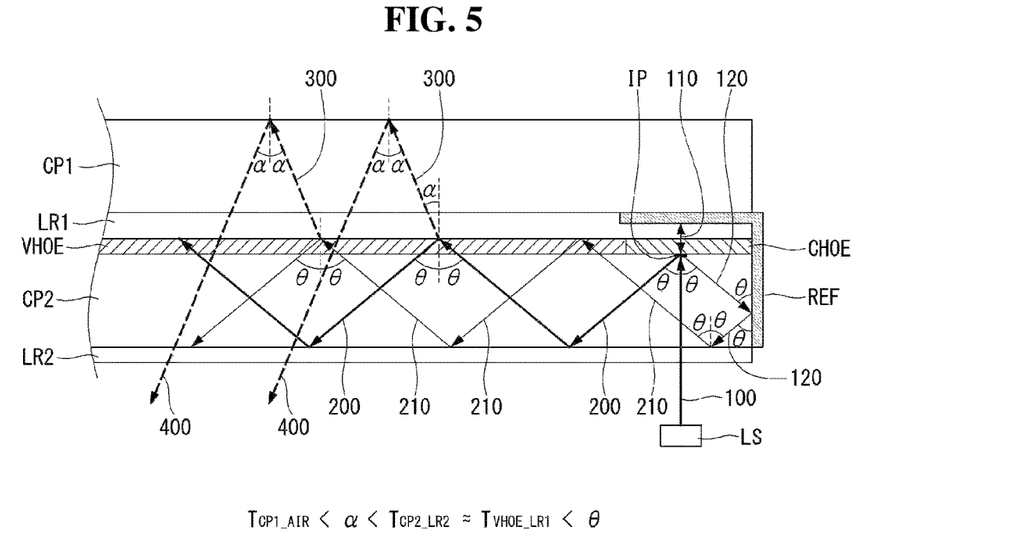
FIG. 5 is a drawing illustrating a structure of a directional optical unit, according to yet another aspect of the present disclosure.

Referring to FIG. 5, yet another aspect of the present disclosure will be explained hereinafter. FIG. 5 illustrates a structure of a directional optical unit, according to yet another aspect of the present disclosure.

Referring to FIG. 5, a directional optical unit according to yet another aspect includes a directional optical substrate SLS and a light source LS. The directional optical unit is an optical device for providing the collimated light expanded covering a large area corresponding to a surface of the display. Therefore, the light source LS may provide collimated light.

The directional optical substrate SLS includes a first cover plate CP1, a second cover plate CP2, a light radiating film VHOE, a light incident film CHOE, a first low refractive layer LR1 and a second low refractive layer LR2. The first cover plate CP1 and the second cover plate CP2 may have a rectangular plate shape having a length, a width and a thickness. The lengths of the first cover plate CP1 and the second cover plate CP2 are disposed along the X-axis, the widths of the first and the second cover plate CP1 and CP2 are disposed along the Y-axis, and the thickness of them are disposed along the Z-axis.

The first cover plate CP1 and the second cover plate CP2 are joined in a face-to-face manner. Under the bottom surface of the first cover plate CP1, the first low refractive layer LR1 is attached. Under the bottom surface of the first low refractive layer LR1, the light radiating film VHOE and the light incident film CHOE are attached. The light radiating film VHOE is an optical element for providing the radiating lights 300. The light radiating film VHOE may be disposed to correspond to the area for detecting and/or sensing the image.

The light incident film CHOE is an optical element for converting the collimated light provided from the light source into the lights expanded over the area of the first cover plate CP1 and the second cover plate CP2. The light incident film CHOE may be disposed at outside of the light radiating film VHOE. Specifically, the light incident film CHOE is disposed to face the light source LS.

The light radiating film VHOE and the light incident film CHOE may be disposed on the same plane level. Considering the manufacturing process, the light radiating film VHOE and the light incident film CHOE may be formed to be separated from each other, on a same film. The light radiating film VHOE and the light incident film CHOE may be the optical elements having the holographic patterns. In this case, after disposing the master film for the light radiating film VHOE and the master film for the light incident film CHOE close to each other, these two holographic patterns may be copied on one holographic recording film, at the same time.

Under the bottom surface of the light radiating film VHOE and the light incident film CHOE, a second cover plate CP2 is disposed as attaching in a face-to-face manner. That is, the second cover plate CP2 is attached on the first cover plate CP1 in a face-to-face manner with the first low refractive layer LR1 and the light radiating film VHOE between the first and the second cover plates CP1 and CP2.

Under the whole bottom surface of the second cover plate CP2, a second low refractive layer LR2 is disposed. The first low refractive layer LR1 and the second low refractive layer LR2 may have the same refractive index. Further, the first low refractive layer LR1 and the second low refractive layer LR2 may have the refractive index lower than that of the first cover plate CP1, the second cover plate CP2 and the light radiating film VHOE.

For example, the first cover plate CP1 and the second cover plate CP2 may be formed of a transparent reinforced glass of which refractive index is 1.5. The light radiating film VHOE and the light incident film CHOE may be the transparent holographic recording film and may have the refractive index same with or slightly larger than that of the first and the second cover plates CP1 and CP2. Here, we use the case that the refractive index of the light radiating film VHOE and the light incident film CHOE are same with that of the first and the second cover plates CP1 and CP2. The refractive index of the first low refractive layer LR1 and the second low refractive layer LR2 may be similar to or slightly larger than the refractive index of the scanning objects. For example, when applying to the fingerprint sensor, the first and the second low refractive layers LR1 and LR2 may have the refractive index of 1.4 similar to the refractive index of human skin, 1.39.

Then, the second cover plate CP2 and the light radiating film VHOE having the refractive index of 1.5 are inserted between the first low refractive layer LR1 and the second low refractive layer LR2 having the refractive index of 1.4. As a result, two low refractive layers are attached at the upper surface and the lower surface of the high refractive layer. This satisfies the total reflection condition in which the light can propagate inside of the high refractive layer. That is, the second cover plate CP2 and the light radiating film VHOE would be the light guiding space in which the lights used for the image sensing are expanded over the whole surface of the display panel.

At the space under the light incident film CHOE, the light source LS is disposed to face the light incident film CHOE. The light source LS may provide highly collimated light such as a LASER beam. Specifically, when applying to the system in which the fingerprint sensor is embedded into a portable display, the light source LS may provide an infrared laser beam which cannot be recognized by human eyes.

The collimated light from the light source LS, as an incident light 100, having a predetermined cross-sectional area is provided to a light incident point IP defined on the light incident film CHOE. The incident light 100 may enter into the normal direction with respect to the surface of the incident point IP. However, it is not restricted, in other case, the incident light 100 may enter into the incident point IP with an inclined angle with respect to the normal direction.

The light incident film CHOE converts the incident light 100 into a propagating light 200 having an incident angle and sends it into the second cover plate CP2. Here, the incident angle may be larger than the internal total reflection critical angle of the second cover plate CP2. As a result, as repeating the total reflection, the propagating light 200 is propagating inside of the second cover plate CP2 along to the X-axis, the length direction of the second cover plate CP2.

All incident lights 100 entering into the light incident film CHOE may not be converted into the propagating lights 200. In accordance with the light efficiency of the light incident film CHOE, the amount of lights converted into the propagating lights 200 among the incident lights 100 would be decided.

In order to recycle the lost (or wasted) amount of the lights, the directional optical substrate SLS according to yet another aspect includes a reflecting layer REF. Specifically, the reflecting layer REF is disposed on the upper surface of the second cover plate CP2 opposite to the light incident film CHOE. At the same time, the reflecting layer REF covers one vertical side surface of the second cover plate CP2 connecting to the upper surface of the second cover plate CP2 opposition to the light incident film CHOE. For example, it is preferable that the reflecting layer REF has a "reversed L" (or bracket) shape, as shown in FIG. 4, covering an edge portion of one upper surface and the one vertical side surface connected to the edge portion of the second cover plate CP2.

The transparent light 110 which is not converted into the propagating light 200 by the light incident film CHOE is reflected by the reflecting layer REF and goes back to the light incident film CHOE. The transparent light 110 reflected to the light incident film CHOE is converted into a refracted light 120 which is refracted to the mirror symmetry direction with the propagating light 200 by the light incident film CHOE. The refracted light 120 goes to the vertical side of the second cover plate CP2. After reflected by the vertical portion of the reflecting layer REF, the refracted light 120 goes to the lower surface of the second cover plate CP2. The refracted light 120 is reflected by the second low refractive layer LR2, because that the refracted light 120 satisfies the total reflection condition at the interface between the second cover plate CP2 and the second low refractive layer LR2, and then it will be a recycled propagating light 210.

The recycled propagating light 210 has the same condition as the propagating light 200. Therefore, as repeating the total reflection, the recycled propagating light 210 is propagating inside of the second cover plate CP2 along the X-axis which is the length direction of the second cover plate CP2. Further, like the propagating light 200, some of the recycled propagating light 210 may be converted into the radiating light 300 by the light radiating film VHOE.

The light radiating film VHOE converts some amount of the propagating light 200 and the recycled propagating light 210 into the radiating light 300 and refracts the radiating light 300 into the first cover plate CP1. Others of the propagating light 200 and the recycled propagating light 210 would continuously be propagating inside of the second cover plate CP2.

The radiating light 300 is totally reflected at the upper surface of the first cover plate CP1. Because the upper surface of the first cover plate CP1 is contact with the air of which refractive index is 1.0. However, at the lower surface of the first cover plate CP1, the radiating light 300 passes through the first low refractive layer LR1 and then enters into the second cover plate CP2. Further, the radiating light 300 may pass through the second low refractive layer LR2 disposed at the bottom surface of the second cover plate CP2 so that the radiating light 300 goes out of the directional optical substrate SLS. In other words, the radiating light 300 totally reflected at the upper surface of the first cover plate CP1 may be sensing light 400 as passing through the bottom surface of the second cover plate CP2.

The light path will be explained hereinafter, in detail. The incident light 100 provided from the light source LS enters into the normal direction with respect to the surface of the incident point IP of the light incident film CHOE. The light incident film CHOE converts the incident light 100 into a propagating light 200 refracted as having an incident angle θ to the normal direction with respect to the surface of the incident point IP. And then, the light incident film CHOE provides the propagating light 200 to the inside space (or 'the media') of the second cover plate CP2.

The incident angle θ of the propagating light 200 may be larger than the total reflection critical angle $T_{VHOE\_LR1}$ at the interface between the light radiating film VHOE and the first low refractive layer LR1. Further, the incident angle θ of the propagating light 200 may be larger than the total reflection critical angle TCP2_LR2 at the interface between the second cover plate CP2 and the second low refractive layer LR2.

For example, when the refraction index of the second cover plate CP2 and the light radiating film VHOE is 1.5, and the refraction index of the first low refractive layer LR1 and the second low refractive layer LR2 are 1.4, the total reflection critical angle $T_{VHOE\_LR1}$ at the interface between the light radiating film VHOE and the first low refractive layer LR1 and the total reflection critical angle $T_{CP2\_LR2}$ at the interface between the second cover plate CP2 and the second low refractive layer LR2 may be greater than 69° (degree). Therefore, the incident angel θ may be larger than 69°. For example, the incident angle θ may be in the range of 70° to 75°.

The incident light 100 entering into the light incident film CHOE is converted into the propagating light 200 in accordance with the light efficiency of the light incident film CHOE. Other light is passing through the light incident film CHOE as the transparent light 110. When the light efficiency of the light incident film CHOE is 80%, 80% of the incident light 100 may be the propagating light 200 and 20% of the incident light may be the transparent light 110.

The transparent light 110 which is not converted into the propagating light 200 by the light incident film CHOE is reflected by the reflecting layer REF and goes back to the light incident film CHOE. Here, the transparent light 110 enters into the light incident film CHOE from the opposite side with the incident light 100. Therefore, the transparent light 110 reflected to the light incident film CHOE is converted into a refracted light 120 which is refracted to the mirror symmetry direction with the propagating light 200 by the light incident film CHOE. The refracted light 120 goes to the vertical side of the second cover plate CP2. After reflected by the vertical portion of the reflecting layer REF, the refracted light 120 goes to the upper surface of the second cover plate CP2. The refracted light 120 is re-reflected by the horizontal portion of the reflecting layer REF and goes to the lower surface of the second cover plate CP2. The refracted light 120 going to the lower surface of the second cover plate CP2 has the incident angle θ to the upper surface of the second cover plate CP2.

After reflected by the vertical portion of the reflecting layer REF, the refracted light 120, as satisfying the total reflection condition inside of the second cover plate CP2, is provide into the second cover plate CP2 as being a recycled propagating light 210 having the same incident angle θ of the propagating light 200. That is, the recycled propagating light 210 has the same property and the same light-path as the propagating light 200. The difference between the propagating light 210 and the propagating light 200 is the points hit by them each other. As the result, the incident light 100 is converted into the propagating light 200 and the recycled propagating light 210 going through into the second cover plate CP2 along the X-axis.

The 80% of the transparent light 100 corresponding to 20% of the incident light 100 is converted into the refracted light 120 by the light incident film CHOE. That is, the refracted light 120 is corresponding to the 16% of the incident light 100. Totally, 4% of the incident light 100 would pass the light incident film CHOE and then goes out of the cover plate CP. According to the third aspect of the present disclosure, the 80% among the 20% of the incident light which may be wasted when the reflecting layer REF is not included would be recycled. According to the present disclosure, at least 96% of the incident light 100 would be used for the propagating light 200 and/or the recycled propagating light 210.

The light radiating film VHOE converts a predetermined amount of the propagating light 200 and the recycled propagating light 210 into a radiating light 300 having a reflection angle α and sends the radiating light 300 back into the inside space of the first cover plate CP1. The radiating light 300 is for detecting an image of an object when the object is contacting on the upper surface of the first cover plate CP1. When there is no object on the outer surface of the first cover plate CP1, the radiating light 300 is totally reflected at the upper surface of the first cover plate CP1 and then is provided to the photo sensor (or, optical sensor) disposed at the outside of the bottom surface of the directional optical substrate SLS. That is, after totally reflected at the upper surface of the first cover plate CP1, the radiating light 300 goes out of the directional optical substrate SLS, as the sensing light 400.

The sensing light 400 is the light reflected by the upper surface of the first cover plate CP1 with an incident angle (or, reflecting angle) of α. The reflecting angle α of the sensing light 400 is smaller than the incident angle θ of the propagating light 200 and the recycled propagating light 210. Therefore, the sensing light 400 passes through the first cover plate CP1, the first low refractive layer LR1, the second cover plate CP2, the light radiating film VHOE and the second low refractive layer LR2 sequentially, and then goes out of the directional optical substrate SLS.

Detecting the sensing light 400 radiated out of the second low refractive layer LR2 disposed under the bottom surface of the directional optical substrate SLS, the images of the object contacted on the upper surface of the first cover plate CP1 may be recognized.

AN APPLICATION EXAMPLE

Until now, the features of the present disclosure based on the directional optical unit for providing the directional lights in the flat panel display embedding an optical image sensor are described. An application example for the whole structure of the flat panel display embedding an optical image sensor formed by joining the flat display panel with a directional optical unit according to the present disclosure will be explained hereinafter.

Figure 6:
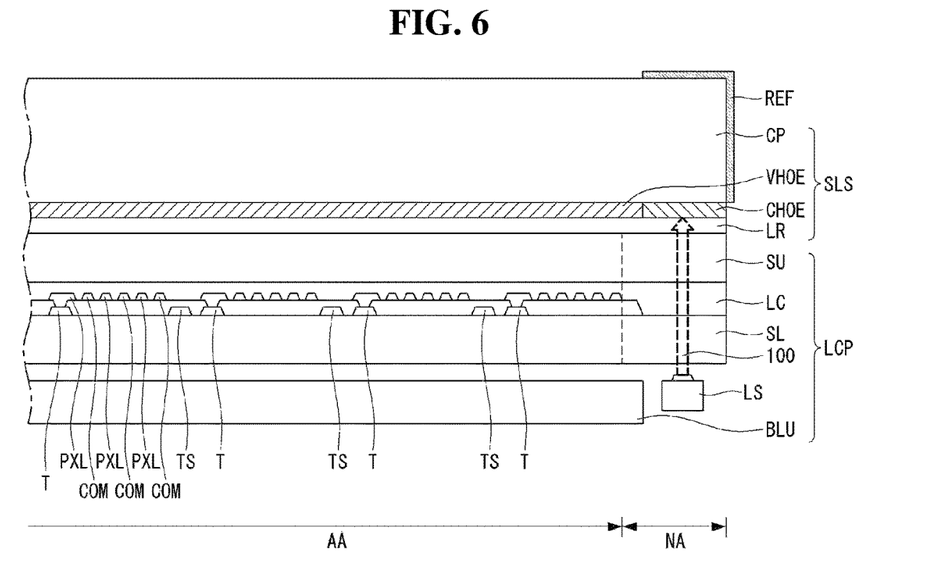
FIG. 6 is a cross-sectional view illustrating a structure of a liquid crystal display embedding an optical image sensor including a directional optical unit and an optical sensor according to an application example.

Referring to FIG. 6, a flat panel display embedding an optical image sensor according to an application example will be explained. FIG. 6 is a cross-sectional view illustrating a structure of a liquid crystal display embedding an optical image sensor including a directional optical unit and an optical sensor according to an application example.

The liquid crystal display embedding an optical image sensor according to an application example includes a liquid crystal display panel LCP, a directional optical substrate SLS and a light source LS. The liquid crystal display panel LCP includes a lower substrate SL and an upper substrate SU joining each other and a liquid crystal layer LC disposed between two substrates SL and SU. On the lower substrate SL, a plurality of the pixel areas are disposed in a matrix manner. At the upper substrate SU, a plurality of color filters is disposed as each color filter is corresponding to each pixel area. Otherwise, the upper substrate SU may have any important elements. Here, the liquid crystal display panel LCP shown in figure is one of a horizontal electric field type. However, it is not restricted this type of liquid crystal display panel, but various type liquid crystal display panels may be used.

Within each pixel area, the pixel electrode PXL and the common electrode COM are disposed for representing video images. Further, the thin film transistor T would be disposed for selectively supplying the video signal to the pixel electrode PXL. The photo sensor TS may be disposed near the thin film transistor T. At least one photo sensor TS may be disposed at each of the pixel area. Otherwise, one photo sensor TS may be disposed at set of the pixel areas.

On the top surface of the upper substrate SU of the liquid crystal display panel LCP, the directional optical substrate SLS according to the aspects of the present disclosure is attached in a face-to-face manner. The directional optical substrate SLS includes a cover plate CP, a light incident film CHOE, a light radiating film VHOE and a low refractive layer LR. The low refractive layer LR of the directional optical substrate SLS is attached with the top surface of the upper substrate SU. Here, the directional optical substrate SLS according to the first aspect is attached on the liquid crystal display panel LDP is explained. In addition, the directional optical substrate SLS may be applied to the liquid crystal display panel LDP.

The liquid crystal display panel LCP is one of the non-self emission display panel which cannot radiate the light. Therefore, a back light unit BLU is required under the bottom surface of the low substrate SL. At one lateral side, the light source LS may be disposed to face the light incident film CHOE. The light source LS may be configured with the back light unit BLU as a one-body system. Otherwise, the light source LS may be disposed near the back light unit BLU to be separate apart from the back light unit BLU.

The liquid crystal display panel LCP includes a display area AA and a non-display area NA. The light radiating film VHOE of the directional optical substrate SLS may be disposed as corresponding to the display area AA. The light source LS may be disposed in the non-display area NA to face the light incident film CHOE.

ANOTHER APPLICATION EXAMPLE

Figure 7:
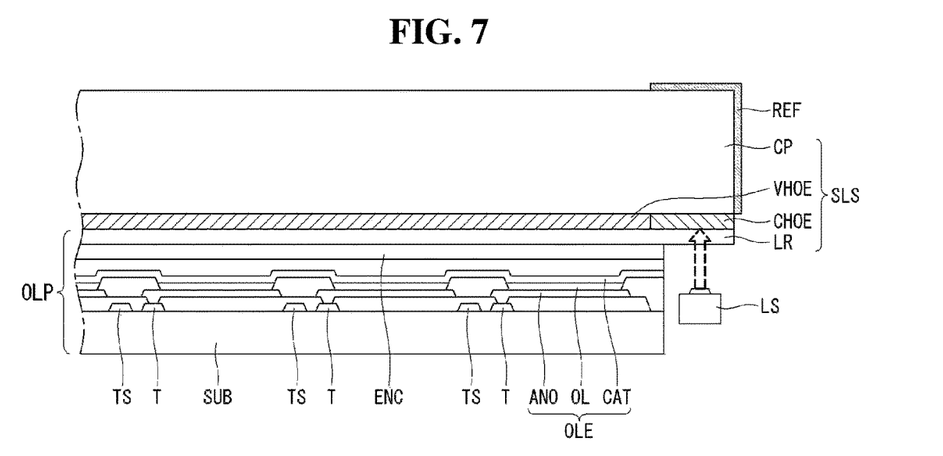
FIG. 7 is a cross-sectional view illustrating a structure of an organic light emitting diode display embedding an optical image sensor including a directional optical unit and an optical sensor according to another application example.

Referring to FIG. 7, a flat panel display embedding an optical image sensor according to another application example. FIG. 7 is a cross-sectional view illustrating a structure of an organic light emitting diode display embedding an optical image sensor including a directional optical unit and an optical sensor according to another application example.

The organic light emitting diode display embedding an optical image sensor according to the second application example comprises an organic light emitting diode display panel OLP, a directional optical substrate SLS and a light source LS. The organic light emitting diode display panel OLP includes a substrate SUB having the display elements and an en-cap ENC, as attaching with each other in a face-to-face manner. On the substrate SUB, a plurality of pixel areas is disposed in a matrix manner. At the en-cap ENC, a plurality of color filters may be disposed as each color filter is corresponding to each pixel area. Otherwise, the en-cap ENC may be a transparent substrate without any specific elements. Here, the organic light emitting diode display panel OLP shown in figure is one of top emission type. However, it is not restricted the top emission type, but various type including bottom emission type or both side emission type may be used.

Within each pixel area, the organic light emitting diode OLE for representing the video image and the thin film transistor T for selectively supplying the video data to the organic light emitting diode OLE. The organic light emitting diode OLE includes an anode electrode ANO, an organic light emitting layer OL and a cathode electrode CAT. The photo sensor TS may be disposed near the thin film transistor T. At least one photo sensor TS may be disposed at each of the pixel area. Otherwise, one photo sensor TS may be disposed at set of the pixel areas.

On the top surface of the en-cap ENC of the organic light emitting diode display panel OLP, the directional optical substrate SLS according to the aspects of the present disclosure is attached in a face-to-face manner. The directional optical substrate SLS includes a cover plate CP, a light incident film CHOE, a light radiating film VHOE and a low refractive layer LR. The low refractive layer LR of the directional optical substrate SLS is attached with the top surface of the en-cap ENC. Here, we explain about that the directional optical substrate SLS according to the first aspect is attached on the organic light emitting diode display panel OLP. In addition, the directional optical substrate SLS may be applied to the organic light emitting diode display panel OLP.

The organic light emitting diode display panel OLP is one of the self-emission display panel which can radiate the light. Therefore, it does not require the back light unit BLU. Therefore, the light source LS may be disposed at one lateral side of the organic light emitting diode display OLP to face the light incident film CHOE.

In detail, the organic light emitting diode display panel OLP includes a display area AA and a non-display area NA. The directional optical substrate SLS may have slightly larger size than the organic light emitting diode display panel OLP. The light radiating film VHOE of the directional optical substrate SLS may be disposed as corresponding to the display area AA. The light incident film CHOE may be disposed as covering an exterior space extended from one lateral side of the organic light emitting diode display panel OLP. The light source LS may be disposed under the exterior space as facing with the light incident film CHOE.

As mentioned above, the display embedding an optical image sensor includes a cover plate disposed at the outermost surface and an ultra-thin film type holographic film having at most some hundreds in of thickness and attached at one side of the cover plate. Therefore, the optical image sensor according to the present disclosure can be configured with the display panel in which the total thickness is not too thick. Further, evenly distributing the highly collimated sensing light over the most surface of the display panel, the ultra-high resolution for image sensing is acquired. Therefore, it is very efficient to precisely detect a tiny image pattern such as fingerprint or palm print one the large area.

The flat display embedding the optical image sensor according to the present disclosure has a feature in which the cover glass of the display panel is used a means for providing lights sensing the image of the object. In addition, thinning the thickness of the cover glass in half and attaching two cover glasses with elements for sensing the image of the object and a decoration film between them, these elements and the deco film can be disposed without any interferences. Using two cover glasses having half thickness, the display device embedding the image sensing function can be acquired with that the total thickness of the display device is not increased.

While the aspect of the present disclosure has been described in detail with reference to the drawings, it will be understood by those skilled in the art that the disclosure can be implemented in other specific forms without changing the technical spirit or essential features of the disclosure. Therefore, it should be noted that the forgoing aspects are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. A flat panel display embedding an image sensor comprising:
   a display panel including a display area and a non-display area;
   a cover plate on the display panel and having a size corresponding to the display panel;
   a light radiating film corresponding to the display area between the cover plate and the display panel;
   a light incident film disposed outside the display area at a lateral side of the light radiating film, under the cover plate;
   a low refractive layer disposed under the light radiating film and the light incident film, and disposed on the display panel;
   a reflecting layer covering an upper edge side of the cover plate facing the light incident film and a vertical side connecting to the upper edge side; and
   a light source disposed at a lateral side of the display panel to vertically overlap the light incident film, wherein the light incident film is disposed between the light source and the cover plate and vertically overlaps the cover plate and the light source.

2. The display according to the claim 1, wherein the light source provides incident light to an incident point defined on a surface of the light incident film;
wherein the light incident film includes a first holographic pattern for converting the incident light to propagating light having an incident angle satisfying a total reflection condition inside the cover plate and sending the propagating light into the cover plate; and
wherein the light radiating film includes a second holographic pattern for converting a portion of the propagating light into sensing light having a reflection angle which satisfies the total reflection condition at an upper surface of the cover plate and a transmitting condition through the low refractive layer.

3. The display according to the claim 2, wherein the incident angle is larger than a first total reflection critical angle between the light radiating film and the low refractive layer, and larger than a second total reflection critical angle at the upper surface of the cover plate.

4. The display according to the claim 2, wherein the reflection angle is larger than a first total reflection critical angle between the cover plate and an air, and smaller than a second total reflection critical angle between the light radiating film and the low refractive layer.

5. The display according to the claim 2, wherein the propagating light has an expanding angle on a horizontal plane including a length axis and a width axis of a directional optical unit, and maintains a collimated state on a vertical plane including the length axis and a thickness axis of the directional optical unit.

6. The display according to the claim 5, wherein the expanding angle is equal to or greater than an inner angle between a first line and a second line, the first line is connecting the incident point and one end of an opposite side of the cover plate facing the light incident film, and the second line is connecting the incident point and other end of the opposite side of the cover plate.

7. The display according to the claim 1, wherein the reflecting layer reflects light passed through the light incident film back into the light incident film;
wherein the light incident film converts the reflected light into a refracted light having an incident angle satisfying a total reflection condition inside the cover plate, and sends to the reflecting layer; and
wherein the reflecting layer reflects the refracted light into the cover plate as recycled propagating light.

8. The display according to the claim 1, wherein the light radiating film and the light incident film are disposed under the cover plate.

9. The display according to the claim 1, wherein the light radiating film and the light incident film are disposed over the cover plate.

10. The display according to the claim 2, further comprising:
an upper low refractive layer disposed on the cover plate; and
an upper cover plate disposed on the upper low refractive layer and the reflecting layer.

11. The display according to the claim 10, wherein the propagating light satisfies a total reflection condition between the low refractive layer and the upper low refractive layer; and
wherein the radiating light is reflected at the top surface of the cover plate as satisfying the total reflection condition, and passes through the upper low refractive layer, the cover plate, the light radiating film and the low refractive layer to be sensing light.

12. A directional optical unit of a display panel with an embedded image sensor configured to providing light from a light source to a surface of the display panel, the display panel having a display area and a non-display area and disposed under the directional optical unit, comprising:
a first cover plate having a size corresponding to the display panel;
a light radiating film corresponding to the display area under the first cover plate;
a light incident film disposed outside the display area under the first cover plate and adjacent to the light radiating film;
a first low refractive layer disposed under the light radiating film and the light incident film, and disposed on the display panel; and
a reflecting layer having first and second portions, wherein the first portion covers an upper edge side of the first cover plate facing the light incident film and the second portion covers a vertical side of the first cover plate,
wherein the light incident film is disposed between the light source and the first cover plate and vertically overlaps the first cover plate and the light source.

13. The directional optical unit according to the claim 12, wherein the light source provides incident light to an incident point defined on a surface of the light incident film,
wherein the light incident film includes a first holographic pattern for converting the incident light to propagating light having an incident angle satisfying a total reflection condition inside the first cover plate and sending the propagating light into the first cover plate; and
wherein the light radiating film includes a second holographic pattern for converting a portion of the propagating light into sensing light having a reflection angle which satisfies the total reflection condition at an upper surface of the cover plate and a transmitting condition through the low refractive layer.

14. The directional optical unit according to the claim 13, wherein the incident angle is larger than a first total reflection critical angle between the light radiating film and the first low refractive layer, and larger than a second total reflection critical angle at the upper surface of the first cover plate.

15. The directional optical unit according to the claim 13, wherein the reflection angle is larger than a first total reflection critical angle between the first cover plate and an air, and smaller than a second total reflection critical angle between the light radiating film and the low refractive layer.

16. The directional optical unit according to the claim 13, wherein the propagating light has an expanding angle on a horizontal plane including a length axis and a width axis of the directional optical unit, and maintains a collimated state on a vertical plane including the length axis and a thickness axis the directional optical unit.

17. The directional optical unit according to the claim 16, wherein the expanding angle is equal to or greater than an inner angle between a first line and a second line, the first line is connecting the incident point and one end of an opposite side of the first cover plate facing the light incident film, and the second line is connecting the incident point and other end of the opposite side of the first cover plate.

18. The directional optical unit according to the claim 12, wherein the reflecting layer reflects light passed through the light incident film back into the light incident film;

wherein the light incident film converts the reflected light into a refracted light having an incident angle satisfying a total reflection condition inside the first cover plate, and sends to the reflecting layer.

19. The directional optical unit according to the claim 12, wherein the light radiating film and the light incident film are disposed under the first cover plate.

20. The directional optical unit according to the claim 12, wherein the light radiating film and the light incident film are disposed over the first cover plate.

21. The directional optical unit according to the claim 13, further comprising:
   a second low refractive layer disposed on the first cover plate; and
   a second cover plate disposed on the second low refractive layer and the reflecting layer.

22. The directional optical unit according to the claim 21, further comprising a decoration film disposed between the second cover plate and the first portion of the reflecting layer.

23. The directional optical unit according to the claim 21, wherein the propagating light satisfies a total reflection condition between the first low refractive layer and the second low refractive layer; and
   wherein the radiating light is reflected at the top surface of the first cover plate as satisfying a total reflection condition, and passes through the second low refractive layer, the first cover plate, the light radiating film and the first low refractive layer to be sensing light.

24. The directional optical unit according to claim 12, further comprising a light source disposed at a lateral side of the display panel and faces the light incident film.

* * * * *